(12) United States Patent
Ma

(10) Patent No.: US 10,503,785 B2
(45) Date of Patent: Dec. 10, 2019

(54) MATRIX VIEW OF ITEMS

(75) Inventor: Ling Ma, Shanghai (CN)

(73) Assignee: eBay Inc., San Jose, CA (US)

( * ) Notice: Subject to any disclaimer, the term of this patent is extended or adjusted under 35 U.S.C. 154(b) by 467 days.

(21) Appl. No.: 12/937,664

(22) PCT Filed: Apr. 25, 2008

(86) PCT No.: PCT/CN2008/000855
§ 371 (c)(1),
(2), (4) Date: Jan. 3, 2011

(87) PCT Pub. No.: WO2009/129659
PCT Pub. Date: Oct. 29, 2009

(65) Prior Publication Data
US 2011/0161354 A1    Jun. 30, 2011

(51) Int. Cl.
*G06F 17/30* (2006.01)
*G06F 16/9038* (2019.01)

(52) U.S. Cl.
CPC ................ *G06F 16/9038* (2019.01)

(58) Field of Classification Search
CPC ................................... G06F 17/30991
USPC ........................................... 707/769
See application file for complete search history.

(56) References Cited

U.S. PATENT DOCUMENTS

| | | | | |
|---|---|---|---|---|
| 7,672,883 B2* | 3/2010 | Harford | ................. | G06Q 10/02 |
| | | | | 705/26.4 |
| 8,234,225 B2* | 7/2012 | Davis | .................... | G06Q 10/04 |
| | | | | 705/1.1 |
| 9,734,257 B2* | 8/2017 | Weber | ................. | G06F 17/3089 |
| 2003/0105728 A1* | 6/2003 | Yano | ...................... | G06Q 10/06 |
| | | | | 705/400 |
| 2003/0125994 A1* | 7/2003 | Jaehn | .................... | G06Q 10/02 |
| | | | | 705/5 |
| 2005/0004852 A1* | 1/2005 | Whitney | ............... | G06Q 40/00 |
| | | | | 705/35 |
| 2006/0277167 A1 | 12/2006 | Gross et al. | | |
| 2007/0237493 A1 | 10/2007 | Hall et al. | | |

FOREIGN PATENT DOCUMENTS

| | | |
|---|---|---|
| CN | 1378160 A | 11/2002 |
| CN | 1752979 A | 3/2006 |
| EP | 1400902 A1 | 3/2004 |
| JP | 2005-165858 A | 6/2005 |
| WO | 2009/129659 A1 | 10/2009 |

OTHER PUBLICATIONS

Jock Mackinlay. 1986. Automating the design of graphical presentations of relational information. ACM Trans. Graph. 5, 2 (Apr. 1986), 110-141.*

(Continued)

*Primary Examiner* — Sheree N Brown
(74) *Attorney, Agent, or Firm* — SBMC

(57) ABSTRACT

Apparatus, systems, and methods may operate to present a plurality of searched items by a plurality of points in a matrix view, which includes a first axis and a second axis, respectively representing a price attribute and one of other attributes of the plurality of items. Additional apparatus, systems, and methods are disclosed.

25 Claims, 8 Drawing Sheets

(56) References Cited

OTHER PUBLICATIONS

"U.S. Appl. No. 12/937,664, Response filed Jul. 18, 2012 to Non Final Office Action dated Apr. 18, 2012", 10 pgs.
International Search Report received for PCT Patent Application No. PCT/CN2008/000855, dated Jan. 22, 2009, 8 pages.
Written Opinion received for PCT Patent Application No. PCT/CN2008/000855, dated Jan. 22, 2009, 6 pages.
International Preliminary Report on Patentability received for PCT Application No. PCT/CN2008/000855, dated Nov. 4, 2010, 8 pages.

* cited by examiner

MATRIX VIEW OF ITEMS

PRIORITY CLAIM TO RELATED APPLICATIONS

This application is a national stage application under 35 U.S.C. § 371 of PCT/CN2008/000855, filed Apr. 25, 2008, and published as WO 2009/129659 on Oct. 29, 2009, which applications and publication are incorporated herein by reference and made a part hereof in their entirety, and the benefit of priority is claimed herein.

TECHNICAL FIELD

Various embodiments described herein relate generally to network systems.

BACKGROUND

The ubiquitous presence of networked computers, and the growing use of databases, web logs, and search engines have resulted in the accumulation of vast quantities of information. Many individual computer users now have access to this huge information via search engines and a bewildering array of web sites. Presenting and processing this huge information in a manner that is user-friendly and efficient creates a number of challenges and complexities.

BRIEF DESCRIPTION OF THE DRAWINGS

The present disclosure is illustrated by way of example and not limitation in the figures of the accompanying drawings, in which.

DETAILED DESCRIPTION

Introduction

In the online sale or auction marketplace, items are typically presented, for example, in a gallery view or a list view, etc. A gallery view is a view that shows a list of items in a series of photos, images or figures. However, when the number of items is large, it is a challenge to traditional ways to efficiently present items so that users can handily find the items to their interests. Some of the embodiments disclosed herein seek to address the challenge of presenting large amounts of data in a meaningful way.

Rather than using a gallery or list view to present a plurality of items obtained from a search, a two-dimensional matrix view is provided for presenting the searched items. The two-dimensional matrix view may for example take the form of a Cartesian coordinate system, which includes a horizontal axis (first axis) and an orthogonally oriented vertical axis (second axis). Points are displayed in the matrix view to represent the selected items (e.g., used cars). The horizontal axis of the matrix view may, e.g., represent a price attribute of the searched items, and the vertical axis may, e.g., represent one of further attributes (e.g., mileages, usage years) of the selected items.

The further attributes (e.g., mileages, usage years) of the used cars may reflect the values (e.g., quality, performance, capability) of the used cars. Since users tend to buy or bid items with greater value/price ratio, buyer users may intuitively find items to their interests out of the large amount of searched items in the matrix view. Seller users may, e.g., use the matrix view as reference before offering their items, and may quickly know the competitiveness of their items.

By using the two-dimensional matrix view, a single page is needed to present a large amount of searched results, without the need of multiple pages by traditional gallery or list views. In addition, the matrix view may provide an enlarged view (e.g., by 10%) to show items obtained from an enlarged search beyond the users' search criteria, which otherwise would be complained by traditional gallery or list view users. The enlarged view of the matrix view may provide extra options to users without increasing burden to the matrix view.

Example Operations

Figure 1:
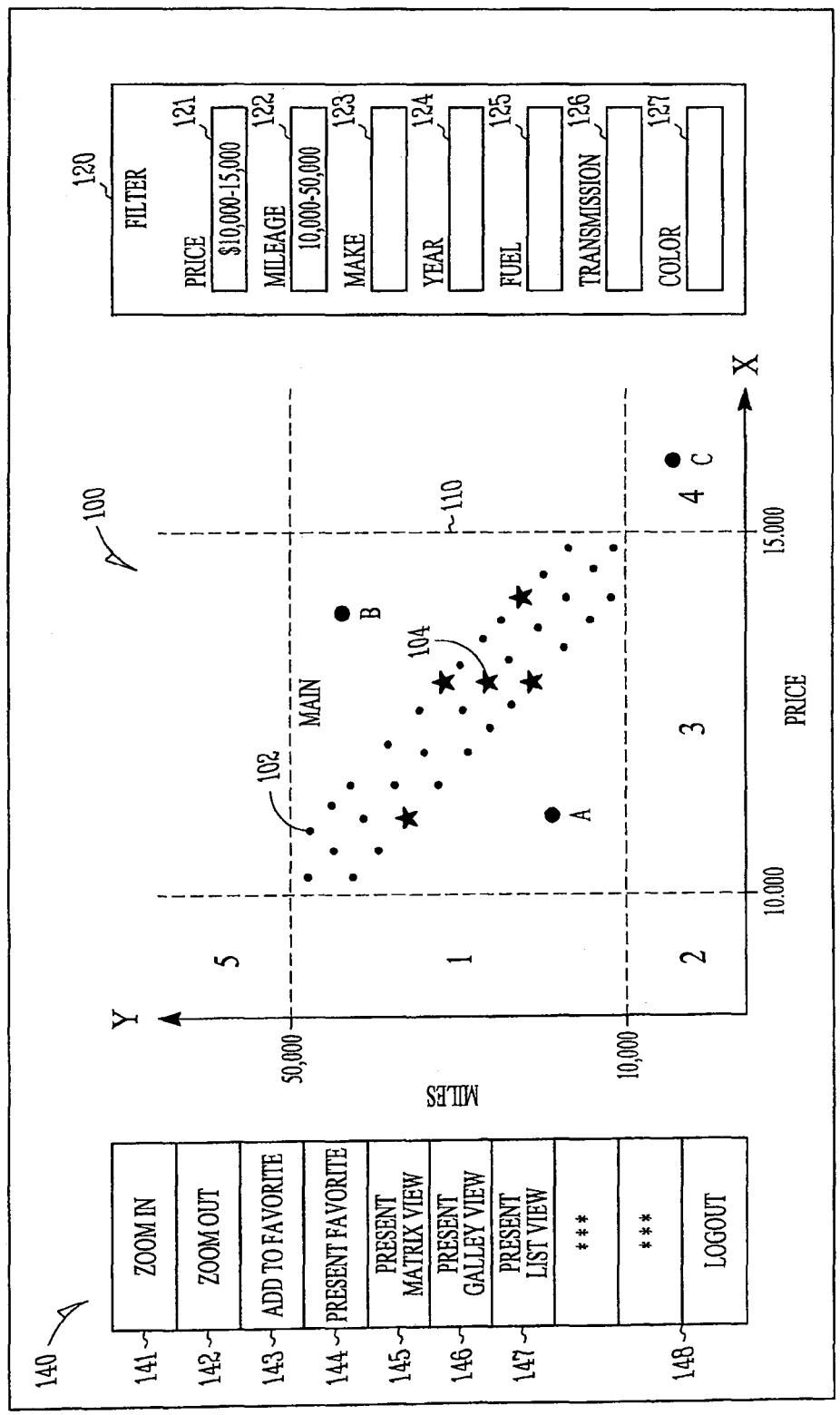
FIG. 1 is a diagram of an example embodiment graphical user interface to present items in a two-dimensional matrix view according to various embodiments.

FIG. 1 is a diagram of a graphical user interface (GUI) to present items in a two-dimensional matrix view according to various embodiments. This is one possible way, out of many, in which items can be presented. The information displayed in the two-dimensional matrix view may represent items in an online sale, items in an online auction up for bid, etc.

As shown in FIG. 1, the used car online sale environment includes a two-dimensional matrix view 100, a filter 120, and a menu 140. Although the matrix view is illustrated to present used cars in the drawings, the matrix view is not limited to present used cars and can present other items than used cars. Another example is diamond, which has a price attribute, and other attributes (e.g., carat, clarity, shape, cut, color, etc) reflecting the value of the diamond.

The filter 120, as shown in FIG. 1, may be used to enter the search criteria for used cars. The filter 120 may include entries, for example, price 121, mileage 122, make (e.g., Ford, Toyota) 123, usage years 124, fuel type (e.g., gasoline, diesel) 125, transmission type (e.g., automatic, manual) 126, and color 127 of their interests. In the shown scenario, a user wants to buy a used car with a price range $10,000-$15,000 and a mileage range 10,000-50,000 miles. The user may optionally enter other search criteria, e.g., automatic transmission, fuel type, color, so that the presented items could be fade in/out. In this way, by using the filter 120, the user may obtain and filter search results, which may include a plurality of items offered by sellers.

After receiving search results, the matrix view 100 may present a plurality of points 102, which respectively represent the searched items (e.g., used cars) to users. The matrix view 100, as shown in FIG. 1, includes a horizontal axis X and a vertical axis Y. The horizontal axis X may represent a price attribute of the used cars. The vertical axis Y may represent one of other attributes (e.g., mileages, usage years)

of the used cars, which may reflect the values (e.g., quality, performance, or capability) of the used cars.

With the matrix view 100, users may intuitively find and focus on attractive used cars, for example, with greater value/price ratio. Referring to FIG. 1, the used car represented by point A looks more attractive than that the one represented by point B, since used cars with less mileage are typically worth of more money, and vice versa. The user can thus quickly locate attractive items at a glance of the matrix view 100, which displays in a single page all the used cars obtained from the search, rather than usually in many pages by traditional gallery or list views. In some embodiments, the matrix view 100 may automatically adjust its size so as to present all the points 102 corresponding to all the searched items.

As shown in FIG. 1, a search with an enlarged range can be made, because user expectations might change in a certain range. For example, users who want to buy a used car below $15,000 does not mean they cannot afford one offered at $16,000. The matrix view 100 may provide an enlarged view (e.g., by 10%) including not only a main area but also, e.g., extra areas 1, 2, 3, 4 and 5. By virtue of the enlarged view, additional items in extra areas 1, 2, 3, 4 and 5 can be presented to the users. In contrast to items in the main area, items in extra area 1 have the same mileage range but with lower price, items in extra area 3 have the same price range but with lower mileage, and items in extra area 2 have both lower mileages and prices. In addition, some items in extra areas 4 and 5 may also be interesting to the users. For example, the item represented by point C in extra area 4, with a low mileage 5000 and offered at $16,000, could also be attractive to the users. Hence, items in extra areas 1, 2, 3, 4 and 5 may be attractive to the users.

The menu 140, as shown in FIG. 1, includes many tools, e.g., "Zoom In" 141, "Zoom Out" 142, "Add To Favorite" 143, "Present Favorite" 144, "Present Matrix View" 145, "Present Gallery View" 146, "Present List View" 147, and Logout" 148, which are programs capable of manipulating the searched items. Here the tools are shown for illustration purpose, and not for limitation.

In an embodiment, users may select (or highlight) an area in the matrix view 100 by drawing a rectangular frame 110 using a mouse. In another embodiment, users may select attractive points 104 by marking them with flags (e.g., shining stars), which can be presented or be saved in a favorite list for future display. Users may use different ways to handle the selected items.

In some embodiments, users may use "Zoom In" tool 141 to zoom in the selected items. Users may use "Zoom Out" tool 142 to zoom out the selected items. Users may use "Add To Favorite" tool 143 to add the selected items to a favorite list of the user for future display. Users may use "Present Favorite" tool 143 to show the items in a favorite list. Users may use "Present Matrix View" tool 145 to display the selected items in the matrix view 100. User may use "Present Gallery View" tool 146 to display the selected items in a gallery view. User may use "Present List View" tool 147 to display the selected items in a list view.

Figure 2:
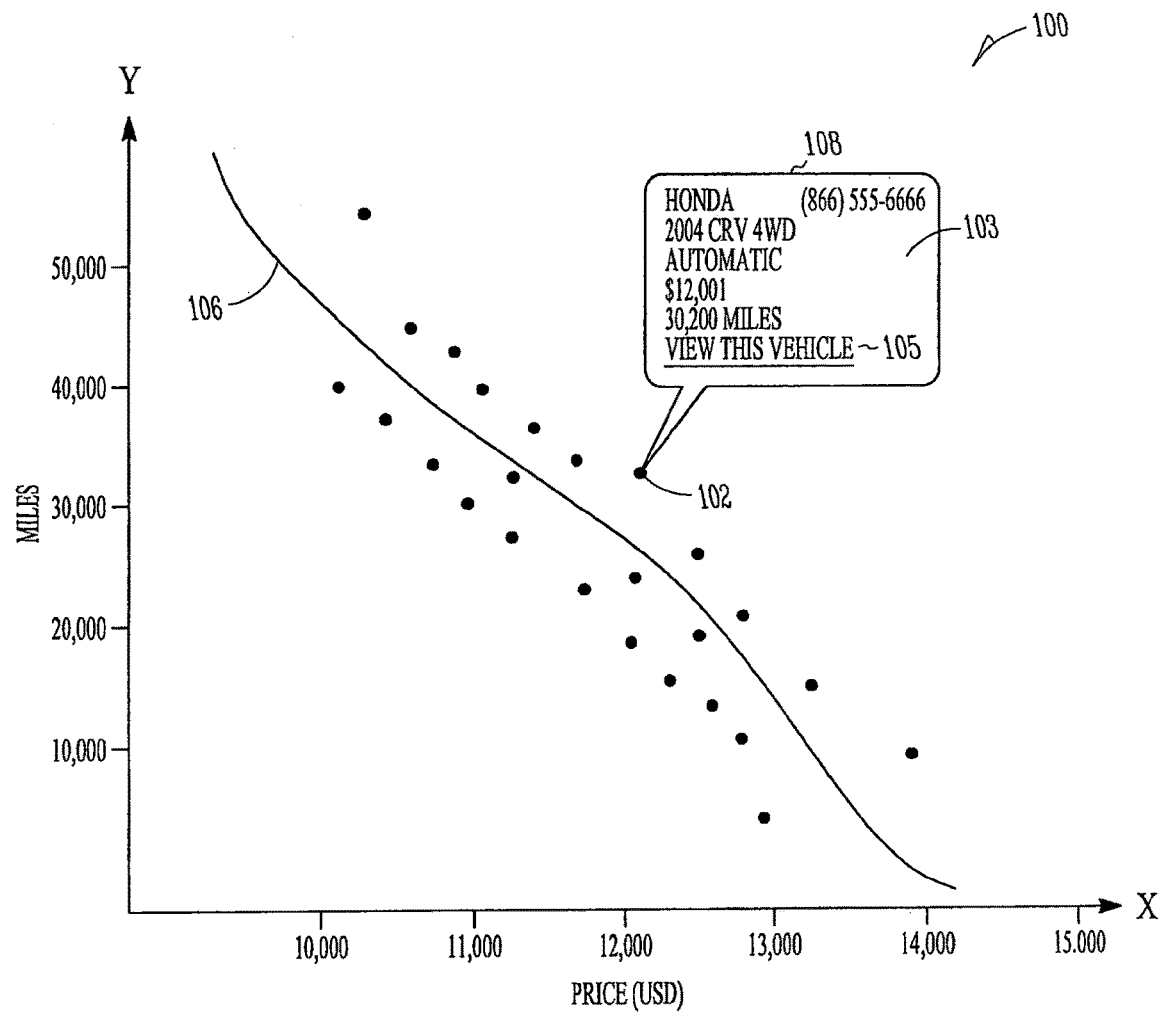
FIG. 2 is a diagram of an example embodiment two-dimensional matrix view according to various embodiments.

As shown in FIG. 2, in some embodiments, once a mouse is moved over a point 102 representing a used car, a pop-up window 108 is triggered to show brief introduction information 103 of the used car and a hyper link 105. By clicking the hyper link 105, the user may navigate to another page or window (not shown), which describes the used car in more detail.

As shown in FIG. 2, the matrix view 100 may present a reference line 106, which indicates reference value information (e.g., reference prices) of the searched used cars. The reference information of the used cars may be provided by a third party, for example, "Kelley Blue Book".

Figure 3:
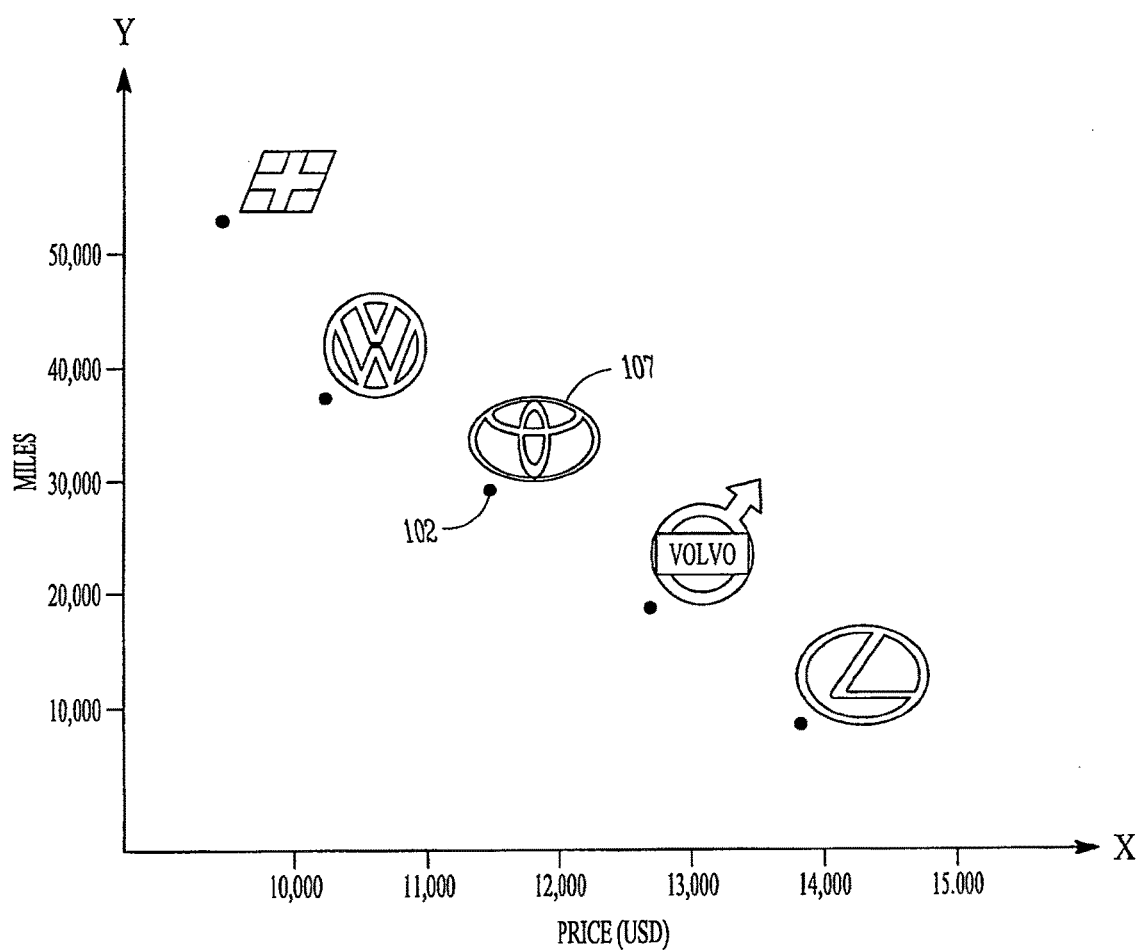
FIG. 3 is a diagram of an example embodiment two-dimensional matrix view according to various embodiments.

As shown in FIG. 3, in some embodiments, the matrix view 100 may present logos 107 of the used cars on or near points 102 to indicate the car brands (e.g., TOYOTA, VOLVO), as long as the number of the presented used cars is not that large for the size of the matrix view 100.

Example Apparatus and Systems

Figure 4:
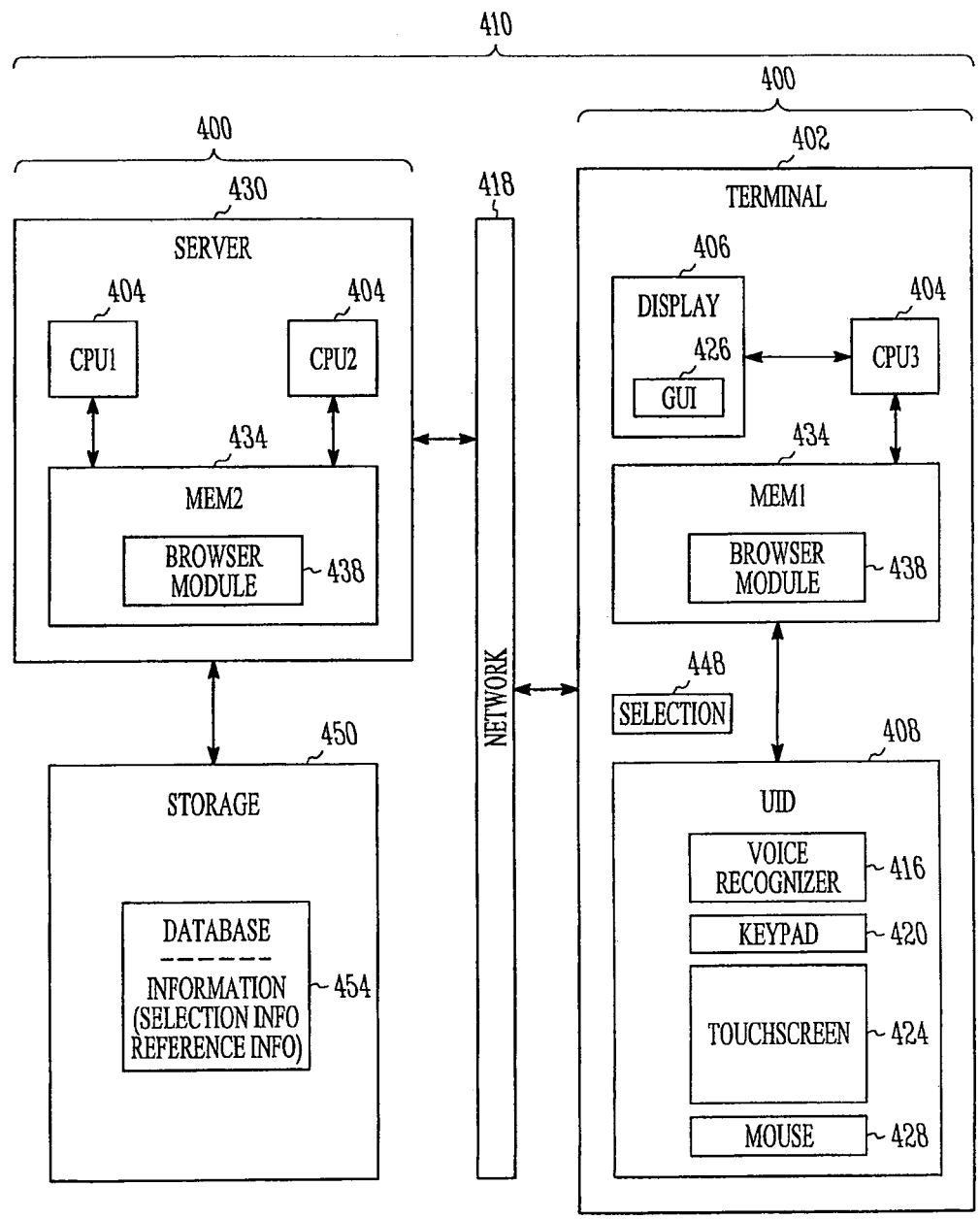
FIG. 4 is a block diagram of an example embodiment apparatus and systems according to various embodiments.

FIG. 4 is a block diagram of apparatus and systems according to various embodiments. The apparatus 400 may comprise many devices, such as a terminal 402, a server 430, a generic computer, or other devices with computational capability. The apparatus 400 may include one or more processors 404 coupled to a memory 434.

For example, an apparatus 400 for accomplishing two-dimensional matrix view presenting of items may comprise a browser module 438, to perform a search to obtain a plurality of items based on a search query in an online marketplace, and a display 406, to present the plurality of items (e.g., used cars) by a plurality of points in a matrix view (e.g., as shown in FIG. 1), in which the matrix view may include a first axis X and a perpendicular second axis Y, respectively representing a price attribute and a second attribute (e.g., mileages, usage years) of the plurality of items.

The browser module 438 may comprise a concrete application, a thin client, or other software and/or firmware to interface with a networked online marketplace. The apparatus 400 may comprise a GUI 426 to couple to the browser module 438. The GUI 426 may be used to arrange a presentation of the searched items in the matrix view.

The apparatus 400 may also include one or more user input devices 408 to receive the search query and to select at least one of the plurality of items shown in the matrix view 100, and a processor 404 to navigate to another page to present the at least one of the plurality of items in details. The user input device 408 may comprise one or more of a voice recognizer 416, a keyboard or keypad 420, a touch screen 424, or a mouse 428.

Selections 448, such as those search results may be received by the apparatus 400 and stored in the memory 434, and/or processed by a combination of the processor 404 and the browser module 438. Thus, many embodiments may be realized. The online marketplace may comprise an online sale environment, an online auction environment, etc.

A system 410 to enable visual browsing may include one or more of the apparatus 400, such as one or more terminals 402, and one or more servers 430. The terminals 402 may take the form of a desktop computer, a laptop computer, a cellular telephone, a point of sale (POS) terminal, and other devices that can be coupled to the server 430 via a network 418. Terminals 402 may include one or more processors 404, and memory 434. The network 418 may comprise a wired network, a wireless network, a local area network (LAN), or a network of larger scope, such as a global computer network (e.g., the Internet). Thus, the terminal 402 may comprise a wireless terminal.

The system 410 may comprise a client computer (e.g., terminal 402) including a display 406 to present a plurality of searched items (e.g., used cars) by a plurality of points in a matrix view, which is associated with an online marketplace. The system 410 may comprise one or more user input devices 408, as well as a server 430 to store at least one of information on the selection of items, reference information provided by a third party, etc. Any one of the processors 404 may operate as described with respect to the apparatus 400 above. The server 430 may comprise a plurality of computers coupled to a global computer network (e.g., the Internet). Storage in conjunction with server 430 operations may be accomplished using the memory 434, the storage unit 450, or both. One or more databases 454 may be maintained by the server 430 to track presentation factor weighting, images and associated information, user activity history, and other information.

Example Methods

Figure 5:
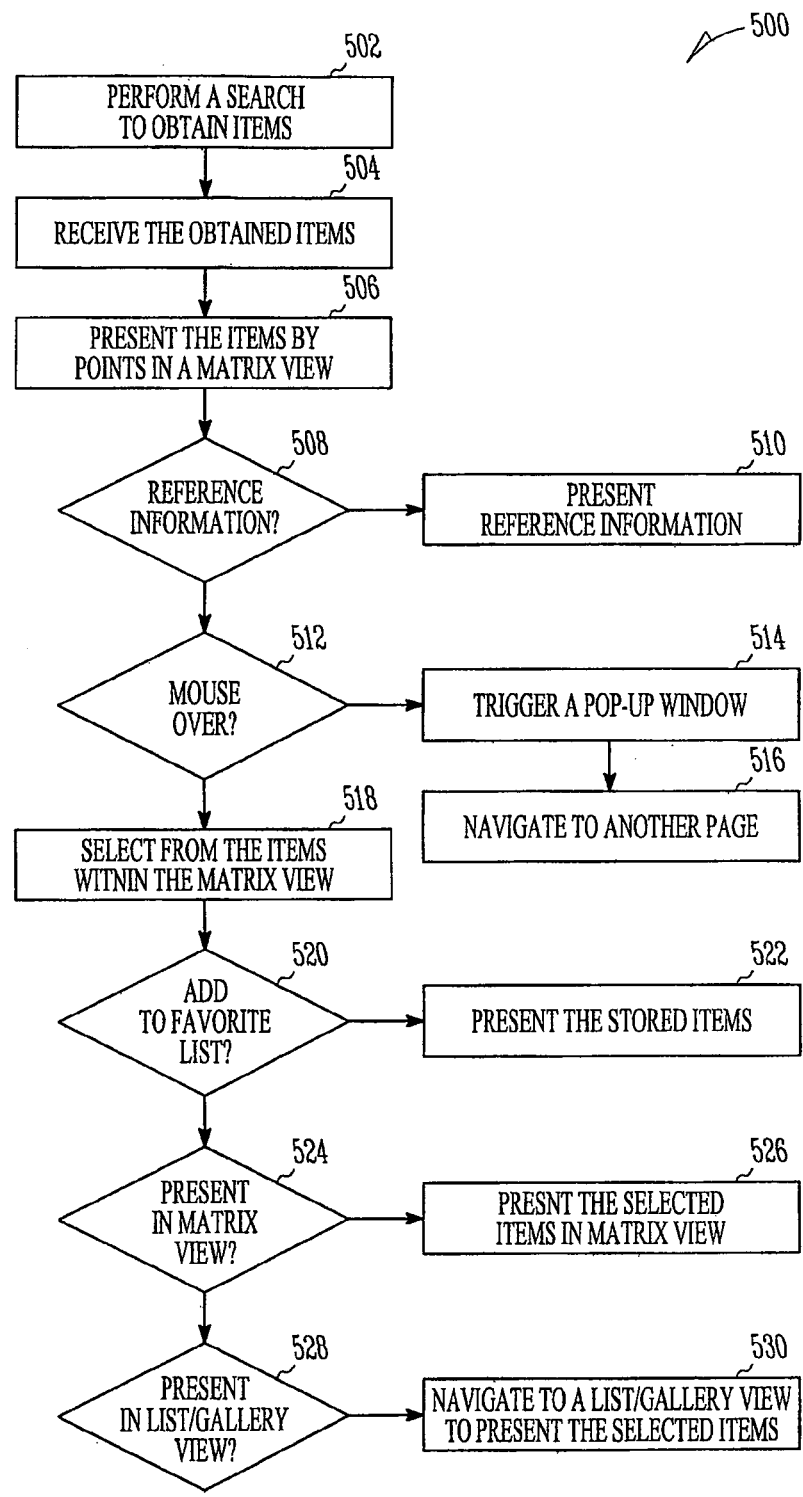
FIG. 5 is a flow diagram of an example embodiment method to present items in a two-dimensional matrix view according to various embodiments.

FIG. 5 is a flow diagram illustrating a method 500 to present items in a two-dimensional matrix view according to various embodiments.

As shown, at 502, a search is performed to obtain a plurality of items by a query. A user may enter, e.g., price and mileage range to search for used cars.

At 504, the obtained search results including a plurality of items (e.g., used cars) are received.

At 506, the received plurality of items are presented by a plurality of points 102 in a two-dimensional matrix view 100 (as shown in FIG. 1) to represent the plurality of items, in which the matrix view 100 may include a first axis (e.g., horizontal axis X) and a perpendicular second axis (e.g., vertical axis Y), respectively representing a price attribute and a second attribute (e.g., mileages, usage years) of the plurality of items.

Optionally, at 508, a user may choose whether or not to have interests in reference value information. If yes, at 510, reference value information (e.g., reference prices for used cars) provided by a third party ("Kelley Blue Book", referred to as "KBB") is presented in the matrix view 100. By the reference value information with respect to the prices and the other attributes (e.g., mileages, years, make, transmission, etc), users may make meaningful comparison.

Optionally, at 512, once a mouse cursor is moved over an item in the matrix view, a pop-up window is triggered at 514 to present brief introduction information of the item and a hyper link. Once clicking the hyper link, at 516, the user may navigate to another page, which describes the selected item in more detail.

Optionally, at 518, some items are selected from the items presented in the matrix view 100. As described previously, there are many ways to select items, for example, highlighting an area including those items in the matrix view, marking items as shinning stars, etc.

Optionally, at 520, a user may choose whether to add the selected items to a favorite list. If yes, at 522, the favorite list may be presented to the user at any future time.

Optionally, at 524, a user may choose to present the selected items in the matrix view 100. If yes, at 526, only the selected items are presented in the matrix view 100 to the user.

Optionally, at 528, a user may choose to present the selected items in a gallery view or a list view. If yes, at 530, the selected items are presented in a gallery view or a list view to the user.

The method 500 described herein does not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Thus, the methods described herein may be performed by processing logic that comprises hardware (e.g., dedicated logic, programmable logic), firmware (e.g., microcode, etc.), software (e.g., algorithmic or relational programs run on a general purpose computer system or a dedicated machine), or any combination of the above. It should be noted that the processing logic may reside in any of the modules described herein.

Therefore, other embodiments may be realized, including a machine-readable medium encoded with instructions for directing a machine to perform operations comprising any of the methods described herein. For example, some embodiments may include a machine-readable medium encoded with instructions for directing a server or client terminal or computer to perform a variety of operations. Such operations may include any of the activities presented in conjunction with the method 500 described above. Various embodiments may specifically include a machine-readable medium comprising instructions, which when executed by one or more processors, cause the one or more processors to perform any of the activities recited by such methods.

Marketplace Applications

Figure 6:
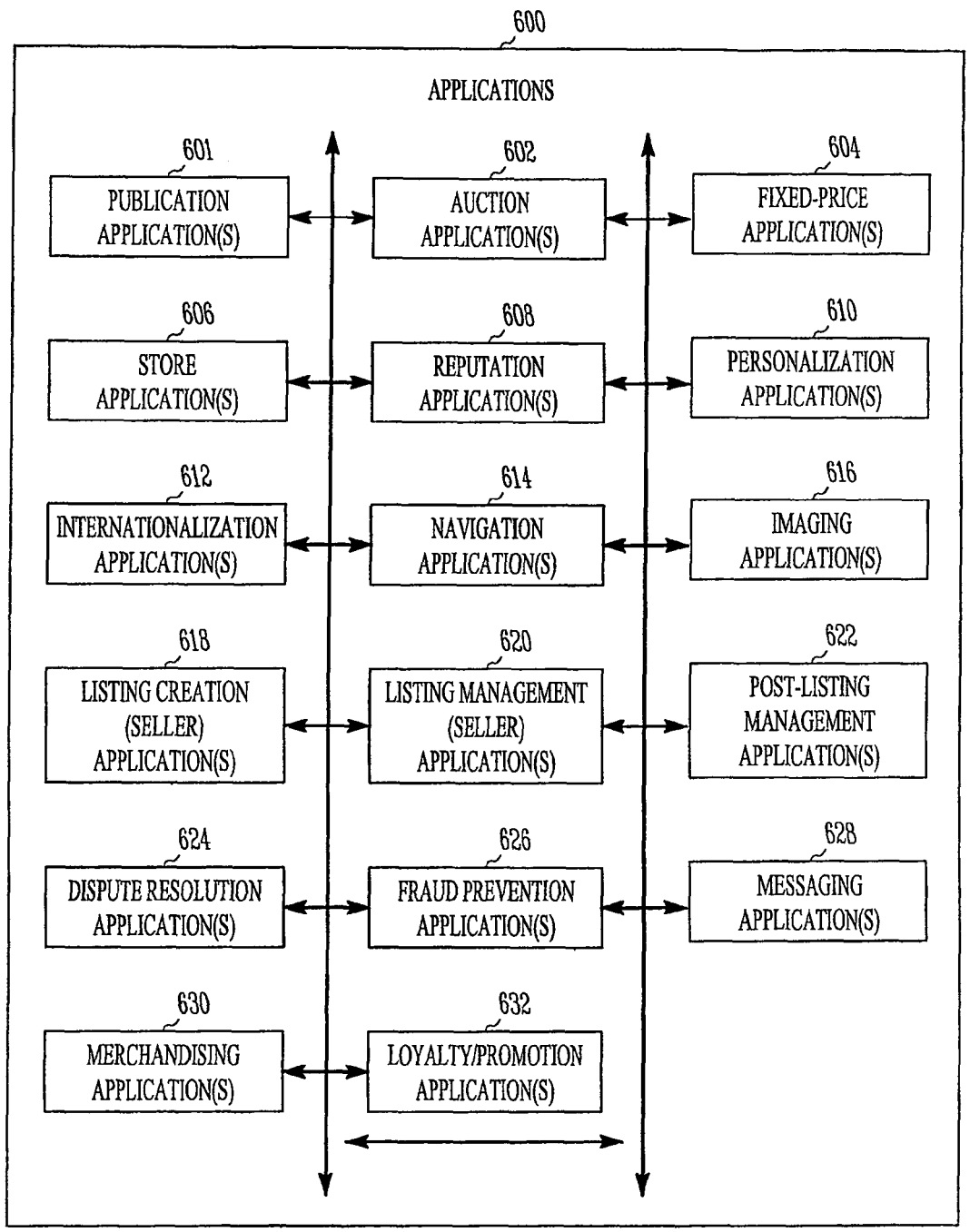
FIG. 6 is a block diagram of application embodiments that can be used in conjunction with two-dimensional matrix view to present items according to various embodiments.

FIG. 6 is a block diagram illustrating applications 600 that can be used in conjunction with two-dimensional matrix view for presenting items according to various embodiments. These applications 600 can be provided as part of a networked system, including the systems 410 and 700 of FIGS. 4 and 7, respectively. The applications 600 may be hosted on dedicated or shared server machines that are communicatively coupled to enable communications between server machines. Thus, for example, any one or more of the applications may be stored in memories 434 of the system 410, and/or executed by the processors 404, as shown in FIG. 4.

The applications 600 themselves are communicatively coupled (e.g., via appropriate interfaces) to each other and to various data sources, so as to allow information to be passed between the applications or so as to allow the applications to share and access common data. The applications may furthermore access one or more databases via database servers (e.g., database server 724 of FIG. 7). Any one or all of the applications 600 may serve as a source of images, associated information, and presentation factors for processing image data according to the methods described herein. The applications 600 may also serve as a source of determined user preferences and/or expressed user preferences.

In some embodiments, the applications 600 may provide a number of publishing, listing and price-setting mechanisms whereby a seller may list (or publish information concerning) goods for sale, a buyer can express interest in or indicate a desire to purchase such goods or services, and a price can be set for a transaction pertaining to the goods. To this end, the applications 600 may include a number of marketplace applications, such as at least one publication application 601 and one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 606 allow a seller to group listings within a "virtual" store, which may be branded and otherwise personalized by and for the seller. Such a virtual store may also offer promotions, incentives and features that are specific and personalized to a relevant seller.

Reputation applications 608 allow users that transact business, perhaps utilizing a networked system, to establish, build and maintain reputations, which may be made available and published to potential trading partners. When, for example, a networked system supports person-to-person trading, users may otherwise have no history or other reference information whereby the trustworthiness and credibility of potential trading partners may be assessed. The reputation applications 608 allow a user, through feedback provided by other transaction partners, to establish a reputation within a networked system over time. Other potential trading partners may then reference such reputations for the purposes of assessing credibility and trustworthiness.

Personalization applications 610 allow users of networked systems to personalize various aspects of their interactions with the networked system. For example a user may, utilizing an appropriate personalization application 610, create a personalized reference page at which information regarding transactions to which the user is (or has been) a party may be viewed. Further, a personalization application 610 may enable a user to personalize listings and other aspects of their interactions with the networked system and other parties.

Marketplaces may be customized for specific geographic regions. Thus, one version of the applications 600 may be customized for the United Kingdom, whereas another version of the applications 600 may be customized for the United States. Each of these versions may operate as an independent marketplace, or may be customized (or internationalized) presentations of a common underlying marketplace. The applications 600 may accordingly include a number of internationalization applications 612 that customize information (and/or the presentation of information) by a networked system according to predetermined criteria (e.g., geographic, demographic or marketplace criteria). For example, the internationalization applications 612 may be used to support the customization of information for a number of regional websites that are operated by a networked system and that are accessible via respective web servers.

Navigation of a networked system may be facilitated by one or more navigation applications 614. For example, a search application (as an example of a navigation application) may enable key word searches of listings published via a networked system publication application 601. A browse application may allow users to browse various category, catalogue, or inventory data structures according to which listings may be classified within a networked system. Various other navigation applications may be provided to supplement the search and browsing applications, including the multi-dimensional dynamic visual browsing applications described herein.

In order to make listings available on a networked system as visually informing and attractive as possible, marketplace applications may operate to include one or more imaging applications 616 which users may use to upload images for inclusion within listings. An imaging application 616 can also operate to incorporate images within viewed listings. The imaging applications 616 may also support one or more promotional features, such as image galleries that are presented to potential buyers. For example, sellers may pay an additional fee to have an image included within a gallery of images for promoted items.

Listing creation applications 618 allow sellers conveniently to author listings pertaining to goods or services that they wish to transact via a networked system, and listing management applications 620 allow sellers to manage such listings. Specifically, where a particular seller has authored and/or published a large number of listings, the management of such listings may present a challenge. The listing management applications 620 provide a number of features (e.g., auto-relisting, inventory level monitors, etc.) to assist the seller in managing such listings. One or more post-listing management applications 622 can assist sellers with activities that typically occur post-listing. For example, upon completion of an auction facilitated by one or more auction applications 602, a seller may wish to leave feedback regarding a particular buyer. To this end, a post-listing management application 622 may provide an interface to one or more reputation applications 608, so as to allow the seller conveniently to provide feedback regarding multiple buyers to the reputation applications 608.

Dispute resolution applications 624 provide mechanisms whereby disputes arising between transacting parties may be resolved. For example, the dispute resolution applications 624 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 626 implement fraud detection and prevention mechanisms to reduce the occurrence of fraud within a networked system.

Messaging applications 628 are responsible for the generation and delivery of messages to users of a networked system, such messages for example advising users regarding the status of listings on the networked system (e.g., providing "outbid" notices to bidders during an auction process or to provide promotional and merchandising information to users). Respective messaging applications 628 may utilize any number of message delivery networks and platforms to deliver messages to users. For example, messaging applications 628 may deliver electronic mail (e-mail), instant message (IM), Short Message Service (SMS), text, facsimile, or voice (e.g., Voice over IP (VW)) messages via wired (e.g., Ethernet, Plain Old Telephone Service (POTS)), or wireless (e.g., mobile, cellular, WiFi, WiMAX) networks.

Merchandising applications 630 support various merchandising functions that are made available to sellers to enable sellers to increase sales via a networked system. The merchandising applications 630 also operate the various merchandising features that may be invoked by sellers, and may monitor and track the success of merchandising strategies employed by sellers.

A networked system itself, or one or more users that transact business via the networked system, may operate loyalty programs that are supported by one or more loyalty/promotions applications 632. For example, a buyer may earn loyalty or promotions points for each transaction established and/or concluded with a particular seller, and be offered a reward for which accumulated loyalty points can be redeemed.

Example Client-Server Architecture

Figure 7:
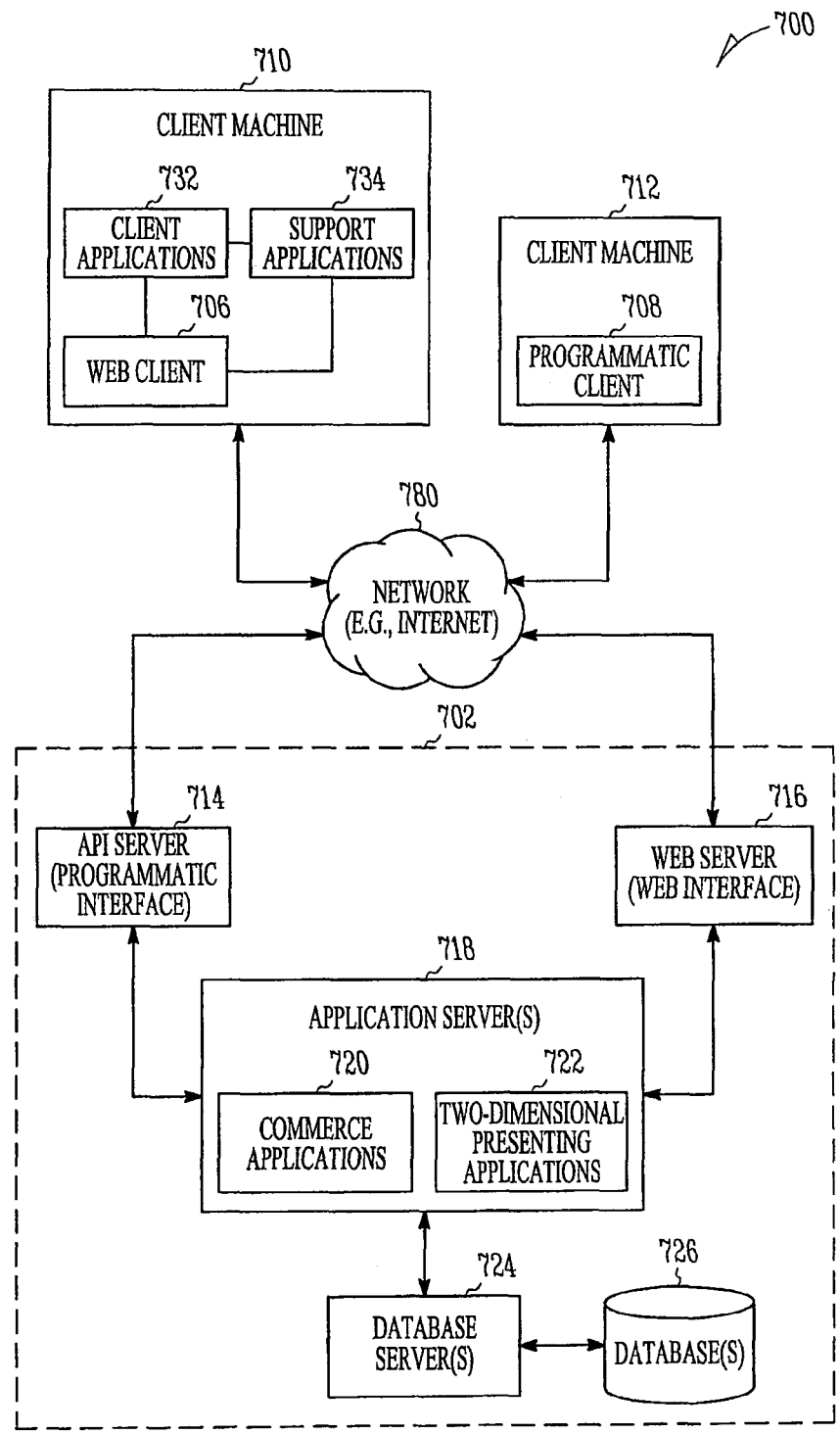
FIG. 7 is a block diagram of an example embodiment client-server architecture to implement two-dimensional matrix view presenting of items according to various embodiments.

FIG. 7 is a block diagram illustrating a client-server architecture to implement two-dimensional matrix view presenting of items according to various embodiments. A platform, such as a network-based information management system 702, provides server-side functionality via a network 780 (e.g., the Internet) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712. In some embodiments, either or both of the web client 706 and programmatic client 708 may include a mobile device.

Turning specifically to the system 702, an Application Program Interface (API) server 714 and a web server 716 are coupled to, and provide programmatic and web interfaces respectively to, one or more application servers 718. The application servers 718 host one or more commerce applications 720 (e.g., similar to or identical to the applications 600 of FIG. 6) and two-dimensional matrix view presenting applications 722. The application servers 718 are, in turn, shown to be coupled to one or more database servers 724 that facilitate access to one or more databases 726 (similar to or identical to the database 454 of FIG. 4), such as registries that include links between individuals, their profiles, their behavior patterns, user-generated information, topical ranks, and signatures.

Further, while the system 700 employs a client-server architecture, the various embodiments are of course not limited to such an architecture, and could equally well be applied in a distributed, or peer-to-peer, architecture system. The various applications 720 and 722 may also be implemented as standalone software programs, which do not necessarily have networking capabilities.

The web client 706, it will be appreciated, may access the various applications 720 and 722 via the web interface supported by the web server 716. Similarly, the programmatic client 708 accesses the various services and functions provided by the applications 720 and 722 via the programmatic interface provided by the application programming interface (API) server 714. The programmatic client 708 may, for example, comprise a browser module (e.g., similar to or identical to the browser module 438 of FIG. 4) to enable a user to submit selections of items, perhaps performing batch-mode communications between the programmatic client 708 and the network-based system 702. Client applications 732 and support applications 734 may perform similar or identical functions.

Example Machine Architecture

Figure 8:
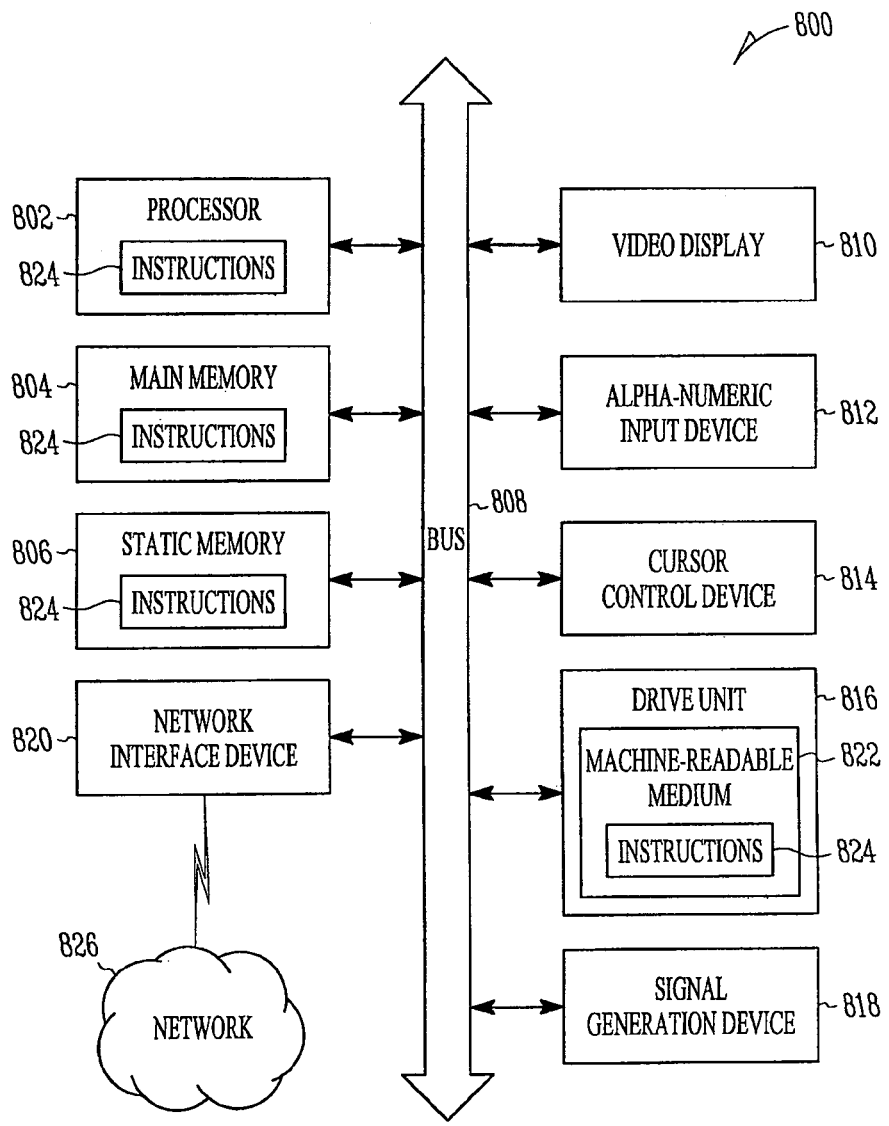
FIG. 8 is a block diagram of a machine in the example form of a computer system according to various embodiments.

FIG. 8 is a block diagram of a machine in the example form of a computer system according to various embodiments. The computer system may include a set of instructions for causing the machine to perform any one or more of the methodologies discussed herein.

In some embodiments, the machine 800 may operate as a standalone device or may be connected (e.g., networked) to other machines. In a networked deployment, the machine 800 may operate in the capacity of a server or a client machine in a server-client network environment, or as a peer machine in a peer-to-peer (or distributed) network environment.

The machine 800 may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, all of which communicate with each other via a bus 808. The computer system 800 may further include a video display unit 810 (e.g., liquid crystal displays (LCD) or cathode ray tube (CRT)). The display unit 810 may be used to display a GUI according to the embodiments described with respect to FIG. 1. The computer system 800 also may include an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 may include a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media. The software 824 may further be transmitted or received over a network 826 via the network interface device 820, which may comprise a wired and/or wireless interface device.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include tangible media that include, but are not limited to, solid-state memories, optical, and magnetic media.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

In conclusion, it can be seen that various embodiments of the invention can operate to present a unique exploration experience to a user accessing large quantities of information. The embodiments disclosed can present a multi-dimensional visual browsing alternative to more conventional keyword-based searching mechanisms, perhaps permitting those of different nationalities or educational levels to access the same data in a similar manner. Increased user satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined by the appended claims, along with the full range of equivalents to which such claims are entitled.

What is claimed is:

1. A computerized method, comprising:
  displaying, by one or more processors, a graphical user interface to present items, wherein the graphical user interface includes a filter to enable a user to enter search criteria for the items, the search criteria including a price attribute associated with the items and a value attribute associated with the items that is different than price;
  receiving, by the one or more processors, search criteria entered in the filter, the value attribute being characterized by a user-defined numerical range;
  generating an enlarged numerical search range based on the user-defined numerical range;
  selecting, by the one or more processors, a plurality of items of interest from a collection of items by filtering the collection of items based on the enlarged numerical search range to include items having the value attribute with a value that falls within the user-defined numerical range and one or more items having the value attribute with a value that falls outside of the user-defined numerical range in the selected plurality of items; and
  displaying, by the one or more processors, the plurality of items as points in a matrix view arranged with a horizontal axis to represent one of the price attribute of each of the plurality of items or the value attribute of each of the plurality of items, and a vertical axis to represent the other of the price attribute of each of the plurality of items or the value attribute of each of the plurality of items, each of the points visually presenting a value/price ratio of each of the plurality of items in a single view,
  wherein said displaying comprises triggering, using the one or more processors, display of additional information related to an item in the matrix view in a pop-up window in response to a cursor moving over the item in the matrix view, the additional information including a hyper link, and
  wherein the single view includes points in a main area that represent the items having the value attribute with the value that falls within the user-defined numerical range and points in an extra area outside the main area that represent items having the value attribute with the value that falls outside of the user-defined numerical range.

2. The computerized method of claim 1, further comprising:
  displaying historical information provided by a third party in the matrix view to define a relationship, for each of the items, between the price attribute of the item and the value attribute of the item.

3. The computerized method of claim 1, further comprising:
  automatically adjusting a size of the matrix view to display all the items of interest in the single view.

4. The computerized method of claim 1, further comprising:
  receiving selection of an area within the matrix view; and
  zooming in on the selected area of the matrix view to display only those items located within the selected area.

5. The computerized method of claim 1, further comprising:
  highlighting a selected area within the matrix view; and
  displaying a list to present list information relating to the items within the highlighted area.

6. The computerized method of claim 1, further comprising:
  marking at least one item in the matrix view; and
  storing information relating to the at least one marked item into a favorite list.

7. The computerized method of claim 1, further comprising:
  marking a plurality of items in the matrix view; and
  displaying information relating to only the marked plurality of items in a modified matrix view.

8. The computerized method of claim 1, further comprising:
  marking a plurality of items in the matrix view; and
  displaying information relating to the marked plurality of items on a list.

9. An apparatus, comprising:
  a browser module to perform a search to obtain a plurality of items based on a search query that includes search criteria for items, the search criteria comprising a price attribute and a value attribute that is characterized by a user-defined numerical range, the value attribute being different than price, the search based on an enlarged numerical search range generated from the user-defined numerical search range;
  a storage device to store the plurality of items;
  a display to display, on a page, the plurality of items as points in a matrix view, the matrix view including a horizontal axis and a vertical axis, the horizontal axis representing one of the price attribute of each of the plurality of items or the value attribute of each of the plurality of items, the vertical axis representing the other of the price attribute of each of the plurality of items or the value attribute of each of the plurality of items, each of the points visually presenting a value/price ratio of the plurality of items in a single view,
  wherein the single view includes points in a main area that represent items having the value attribute with a value that falls within the user-defined numerical range and points in an extra area outside the main area that represent items having the value attribute with a value that falls outside the user-defined numerical range based on filtering a collection of items using the enlarged numerical search range to obtain the plurality of items; and a user input device to receive the search query, the search query including the user-defined numerical range used to generate the enlarged numerical search range.

10. The apparatus of claim 9, wherein the user input device comprises at least one of a keyboard, a mouse, and a touch screen.

11. A system, comprising:
a browser module to perform a search to obtain a plurality of items based on a search query that includes search criteria, the search criteria comprising a price attribute and a value attribute that is characterized by a user-defined numerical range, the value attribute being different than price, the search based on an enlarged numerical search range that is generated from the user-defined numerical range;
a client computer including a display to present the plurality of items as a plurality of points in a matrix view, the matrix view including a horizontal axis and a vertical axis, the horizontal axis representing one of the price attribute of each of the plurality of items or the value attribute of each of the plurality of items, the vertical axis representing the other of the price attribute of each of the plurality of items or the value attribute of each of the plurality of items, each of the points visually presenting a value/price ratio of the plurality of items in a single view,
wherein the single view includes points in a main area that represent items having the value attribute with a value that falls within the user-defined numerical range and points in an extra area outside the main area that represent items having the value attribute with a value that falls outside the user-defined numerical range based on filtering a collection of items using the enlarged numerical search range to obtain the plurality of items;
a user input device to receive the search query, the search query including the user-defined numerical range used to generate the enlarged numerical search range; and
a server to communicate information, relevant to the plurality of items, to the client computer.

12. The system of claim 11, wherein the browser module is divided between the client computer and the server.

13. The system of claim 11, wherein the server comprises a plurality of computers coupled to a global computer network.

14. A non-transitory machine-readable storage medium comprising instructions, which when executed by one or more processors, perform operations comprising:
receiving a plurality of items obtained through a search based on search criteria characterizing a value attribute of the plurality of items with a user-defined numerical range, the value attribute being different than price, the search based on filtering a collection of items using the user-defined numerical range and an enlarged numerical search range that is outside the user-defined range to obtain the plurality of items; and
presenting the received plurality of items as a plurality of points in a matrix view, the matrix view including a horizontal axis and a vertical axis, the horizontal axis representing one of a price attribute of each of the plurality of items or the value attribute of each of the plurality of items, and a vertical axis representing the other of the price attribute of each of the plurality of items or the value attribute of each of the plurality of items, each of the points visually presenting a value/price ratio of the plurality of items in a single view,
wherein the single view includes points associated with the enlarged numerical search range, wherein a first portion of the points that are included in a main area represent items having the value attribute with a value that falls within the user-defined numerical range and a second portion of the points that are included in an extra area outside the main area represent items having the value attribute with a value that falls outside the user-defined numerical range.

15. The machine-readable medium of claim 14, further comprising:
presenting reference information provided a third party in the matrix view, wherein the reference information defines a relationship, for each of the items, between the price attribute of the item and the value attribute of the item.

16. The machine-readable medium of claim 14, further comprising:
highlighting an area in the matrix view to select items therein; and
navigating to a list view to present the selected items.

17. The machine-readable medium of claim 14, further comprising:
marking items selected from the plurality of items;
navigating to another page to present the marked items in a list view.

18. The computerized method of claim 1, wherein the value attribute includes quality value, performance value, or capability value of the items.

19. The computerized method of claim 18, wherein the items include used cars, and wherein the value attribute of the used cars includes used years, or mileages.

20. The apparatus of claim 9, wherein the value attribute of the items includes quality value, performance value, or capability value of the items.

21. The system of claim 11, wherein the value attribute of the items includes quality value, performance value, or capability value of the items.

22. The machine-readable medium of claim 14, wherein the value attribute of the items includes quality value, performance value, or capability value of the items.

23. The computerized method of claim 1 further comprising:
navigating, in response to selection of the hyper link, to another window to present further detailed information relating to the item.

24. The apparatus of claim 9, wherein the display is further to present additional information related to an item in the matrix view in a pop-up window in response to a cursor moving over the item in the matrix view, the additional information including a hyper link; and further comprising a processor to navigate, in response to selection of the hyper link, to a further page to present further detailed information relating to the item.

25. The machine-readable medium of claim 14, further comprising:
presenting additional information related to an item in the matrix view in a pop-up window in response to a cursor moving over the item in the matrix view, the additional information including a hyper link; and
navigating, in response to selection of the hyper link, to another window to present further detailed information relating to the item.

* * * * *